United States Patent
Schwagmeyer et al.

(10) Patent No.: US 11,975,699 B2
(45) Date of Patent: May 7, 2024

(54) METHOD FOR MONITORING AN IMPLEMENTATION OF AN AUTOMATEDLY DEMANDED BRAKING PRESET, AND BRAKE SYSTEM

(71) Applicant: WABCO GmbH, Hannover (DE)

(72) Inventors: Florian Schwagmeyer, Uetze (DE); Torsten Wallbaum, Duingen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 1237 days.

(21) Appl. No.: 16/606,229

(22) PCT Filed: Mar. 22, 2018

(86) PCT No.: PCT/EP2018/057373
§ 371 (c)(1),
(2) Date: Oct. 18, 2019

(87) PCT Pub. No.: WO2018/192738
PCT Pub. Date: Oct. 25, 2018

(65) Prior Publication Data
US 2020/0055511 A1 Feb. 20, 2020

(30) Foreign Application Priority Data
Apr. 20, 2017 (DE) ...................... 10 2017 003 782.5

(51) Int. Cl.
*B60T 17/22* (2006.01)
*B60Q 9/00* (2006.01)
(Continued)

(52) U.S. Cl.
CPC .............. *B60T 17/221* (2013.01); *B60Q 9/00* (2013.01); *B60T 7/12* (2013.01); *B60T 8/171* (2013.01);
(Continued)

(58) Field of Classification Search
CPC .......... B60T 17/221; B60T 7/12; B60T 8/171; B60T 8/17616; B60T 8/321;
(Continued)

(56) References Cited

U.S. PATENT DOCUMENTS

2015/0084402 A1   3/2015   Tober et al.
2018/0072287 A1   3/2018   Boethel
(Continued)

FOREIGN PATENT DOCUMENTS

DE          19913381 A1      10/2000
DE        102010048884 A1 *   8/2011
(Continued)

*Primary Examiner* — Maceeh Anwari
(74) *Attorney, Agent, or Firm* — LEYDIG, VOIT & MAYER, LTD.

(57) ABSTRACT

A method for monitoring an implementation of an assistance braking specification, requested in an automated fashion by a brake system in a vehicle includes: detecting whether an assistance braking specification which is requested in an automated fashion is present; detecting an actual dynamics variable, the actual dynamics variable including wheel dynamics of at least one wheel of the vehicle and/or of a trailer, the actual dynamics variable being assigned to a wheel which is to be braked as a result of the assistance braking specification which is requested in an automated fashion; determining a reference dynamics variable, the reference dynamics variable including driving dynamics of the vehicle and/or of the trailer; and comparing the actual dynamics variable with the reference dynamics variable. When an assistance braking specification is present: a fault-free implementation of the assistance braking specification which is requested is detected if the actual dynamics variable deviates.

17 Claims, 5 Drawing Sheets

(51) Int. Cl.
  *B60T 7/12*    (2006.01)
  *B60T 8/171*   (2006.01)
  *B60T 8/1761*  (2006.01)
  *B60T 8/32*    (2006.01)

(52) U.S. Cl.
  CPC .......... *B60T 8/17616* (2013.01); *B60T 8/321* (2013.01); *B60T 2201/03* (2013.01); *B60T 2240/00* (2013.01); *B60T 2250/00* (2013.01); *B60T 2250/04* (2013.01); *B60T 2270/10* (2013.01)

(58) Field of Classification Search
  CPC ............. B60T 2201/03; B60T 2240/00; B60T 2250/00; B60T 2250/04; B60T 2270/10; B60T 2240/04; B60T 8/1708; B60T 8/94; B60T 17/22; B60Q 9/00
  USPC .......................................................... 701/78
  See application file for complete search history.

(56) References Cited

U.S. PATENT DOCUMENTS

| | | |
|---|---|---|
| 2018/0072290 A1 | 3/2018 | Boethel |
| 2018/0126968 A1 | 5/2018 | Eckert et al. |

FOREIGN PATENT DOCUMENTS

| | | | |
|---|---|---|---|
| DE | 102010048884 A1 | | 8/2011 |
| DE | 102015006703 A1 | | 11/2016 |
| DE | 102015006738 A1 | | 11/2016 |
| EP | 2108554 A1 | | 10/2009 |
| GB | 2462864 A | | 2/2010 |
| WO | WO2017008879 | * | 1/2017 |
| WO | WO 2017008879 A1 | | 1/2017 |

\* cited by examiner

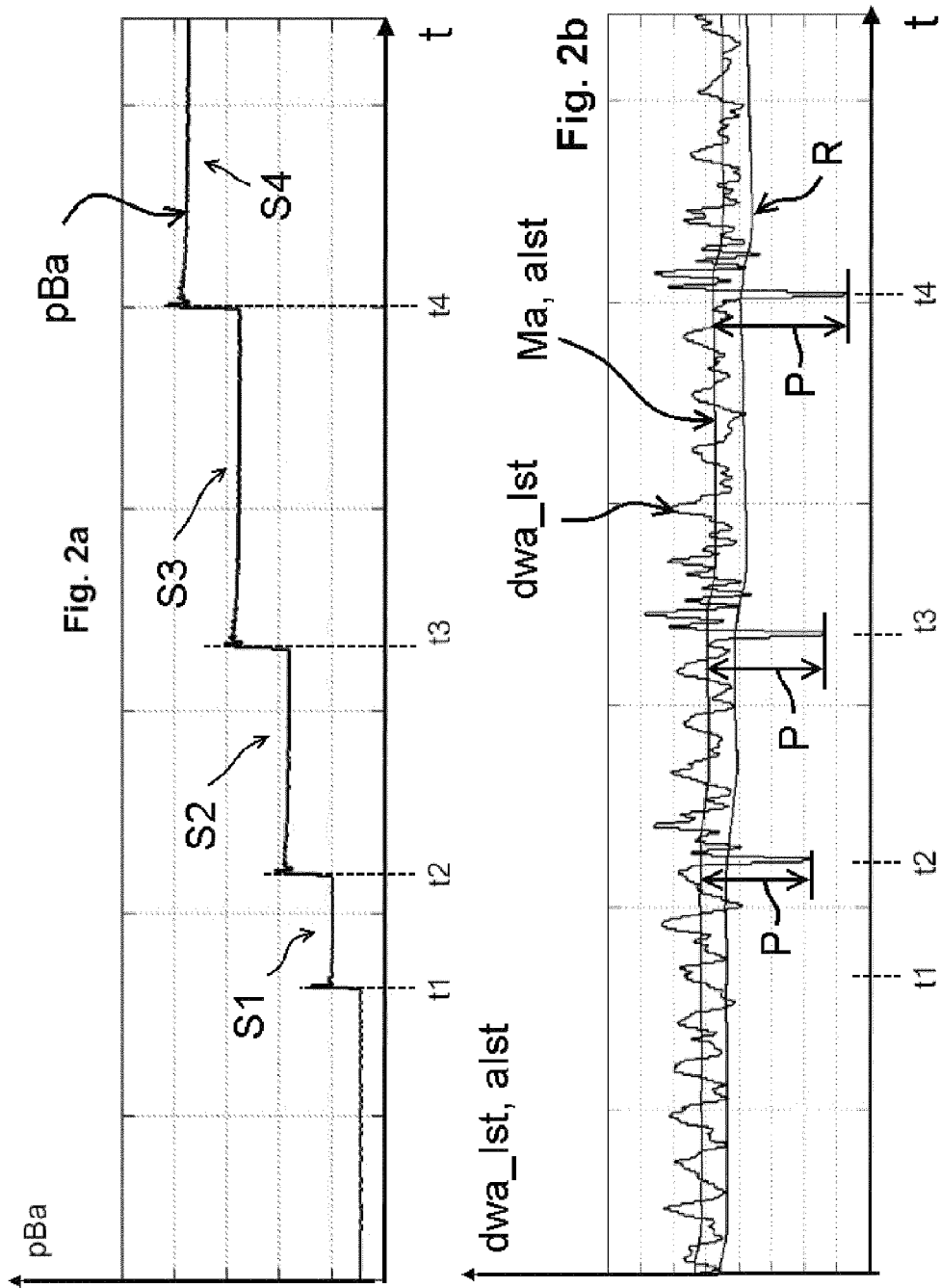

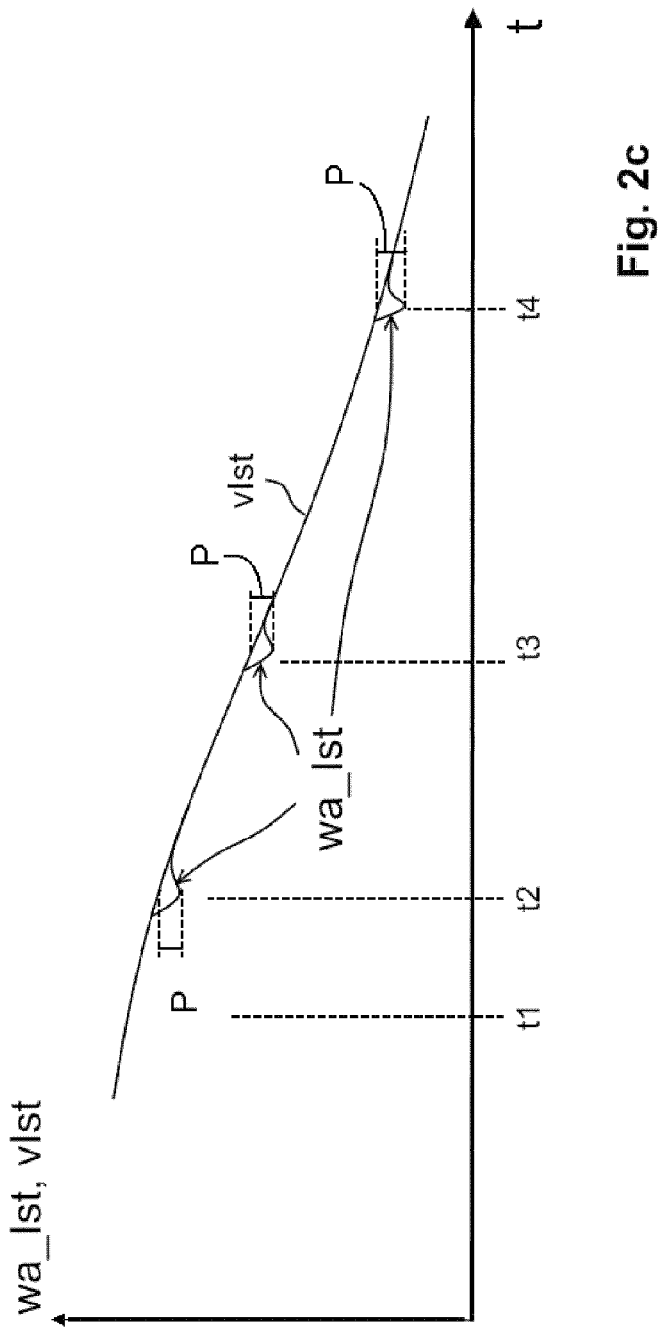

METHOD FOR MONITORING AN IMPLEMENTATION OF AN AUTOMATEDLY DEMANDED BRAKING PRESET, AND BRAKE SYSTEM

CROSS-REFERENCE TO PRIOR APPLICATIONS

This application is a U.S. National Phase application under 35 U.S.C. § 371 of International Application No. PCT/EP2018/057373, filed on Mar. 22, 2018, and claims benefit to German Patent Application No. DE 10 2017 003 782.5, filed on Apr. 20, 2017. The International Application was published in German on Oct. 25, 2018 as WO/2018/192738 under PCT Article 21(2).

FIELD

The invention relates to a method for monitoring an implementation of a braking specification, which is requested in an automated fashion, in a brake system in a vehicle, in particular utility vehicle, and to a brake system in particular to ABS brake system, for carrying out the method.

BACKGROUND

Vehicles having an ABS system can, on the one hand, be braked as a function of a service-brake braking specification which is specified by the driver via a service brake valve, in that a corresponding service-brake control pressure is output by the service brake valve, said service-brake control pressure being subsequently output to vehicle service brakes of the respective vehicle axle with boosting of the air quantity via relay valves at the vehicle axles. In this context, in each case an ABS control valve is connected upstream of the vehicle service brakes, which ABS control valve can adapt, under electrical control by a central module, the service-brake brake pressure which is applied to the vehicle service brakes, in order, in particular, to be able to react to a case of brake slip or a case of drive slip by keeping the service-brake brake pressure constant or reducing it. Correspondingly, the service-brake control pressure can also be output via a trailer control valve to trailer service brakes, upstream of which ABS control valves for slip control are also connected.

Furthermore, in such an ABS brake system it also possible to implement an assistance braking specification which is specified in an automated fashion and which is fed to the central module by an external control module in the vehicle. In order to implement this assistance braking specification, a switching valve, in particular a 3/2-way valve is connected upstream of the relay valves and outputs, depending on the presence of an assistance braking specification the service-brake control pressure, which is output by the service brake valve, to the relay valve or applies pressure medium from a pressure medium reservoir in the vehicle to the relay valve. In order to achieve a graduated braking effect with the pressure medium from the pressure medium reservoir, the service-brake brake pressure which is ultimately applied to the vehicle service brakes can be correspondingly adapted by the central module via the ABS control valves. A graduated braking effect at the trailer can be achieved in this case by means of an additional pressure control valve upstream of the trailer control valve, which additional pressure control valve correspondingly adapts the pressure prevailing in the pressure medium reservoir and therefore functions similarly to the ABS control valves upstream of the vehicle service brakes.

In conventional ABS brake systems, there is no pressure sensor connected upstream or downstream at least of the ABS control valves, so that it cannot be tested whether, in particular when an assistance braking specification which is requested in an automated fashion is present, a corresponding service-brake brake pressure also actually flows into the brake cylinders of the vehicle service brakes. It can therefore not be tested whether, in particular, the switching valve has a mechanical defect, i.e. when an assistance braking specification is present the switching valve is switched into the corresponding switching-valve switched position which firstly permits implementation of the assistance braking specification.

Testing as to whether a braking specification is implemented by the vehicle services brakes in a brake system, and correspondingly a service-brake brake pressure is built up, is described in DE 199 13 381 A1. Accordingly there is provision that by activating the service brake valve a brake signal generator switch is switched, which brake generator switch connects a voltage source to an evaluation device as long as a service-brake brake pressure has not yet been built up in the vehicle service brakes. However, if a delayed build up of the service-brake brake pressure takes place, this is measured by a pressure sensor and the connection between the voltage source and the evaluation device is disconnected. Subsequently it is checked whether the vehicle is braked or unbraked, wherein for this purpose actual wheel speeds are detected via wheel speed sensors, and wheel slips or wheel decelerations are determined therefrom. From this it is determined whether the vehicle is also actually being braked or not. Therefore the plausibility is checked as to whether a braking effect is also actually achieved when the service brake valve is actuated by the driver and a subsequent rise in the service-brake brake pressure. For this purpose, in particular the potential profile which is applied to the evaluation device is compared with a setpoint potential profile. Thus, it is only detected via the actual wheel speed whether a braking operation is occurring or not.

It is disadvantageous here that this testing can only take place if the driver intervenes himself via the service brake valve. Furthermore, a pressure sensor is necessary in order to determine whether a service-brake buildup of brake pressure takes place and to infer, together with the evaluation of the potential profiles, correct implementation of the braking specification. If such a pressure sensor is not present, as in a customary ABS brake system, such testing cannot take place.

SUMMARY

In an embodiment, the present invention provides a method for monitoring an implementation of an assistance braking specification, requested in an automated fashion, by a brake system comprising an ABS brake system, in a vehicle comprising a utility vehicle, having at least the following steps: detecting whether an assistance braking specification which is requested in an automated fashion is present; detecting an actual dynamics variable, the actual dynamics variable comprising wheel dynamics of at least one wheel of the vehicle and/or of a trailer, the actual dynamics variable being assigned to a wheel which is to be braked as a result of the assistance braking specification which is requested in an automated fashion; determining a reference dynamics variable, the reference dynamics variable comprising driving dynamics of the vehicle and/or of the trailer; and comparing the actual dynamics variable with the reference dynamics variable, wherein when an assistance braking specification is present: a faultfree implementation of the assistance braking specification which is requested in an automated fashion is detected if the actual dynamics variable deviates, taking into account a noise deviation, at least temporarily from the reference dynamics variable by a pulse deviation, and/or a faulty implementation of this assistance braking specification which is requested in an automated fashion is detected if the actual dynamics variable does not deviate, taking into account the noise deviation, from the reference dynamics variable by a pulse deviation.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 2a, b, c show driving dynamics profiles and wheel dynamics profiles for an assistance braking specification which is present;

DETAILED DESCRIPTION

Figure 1:
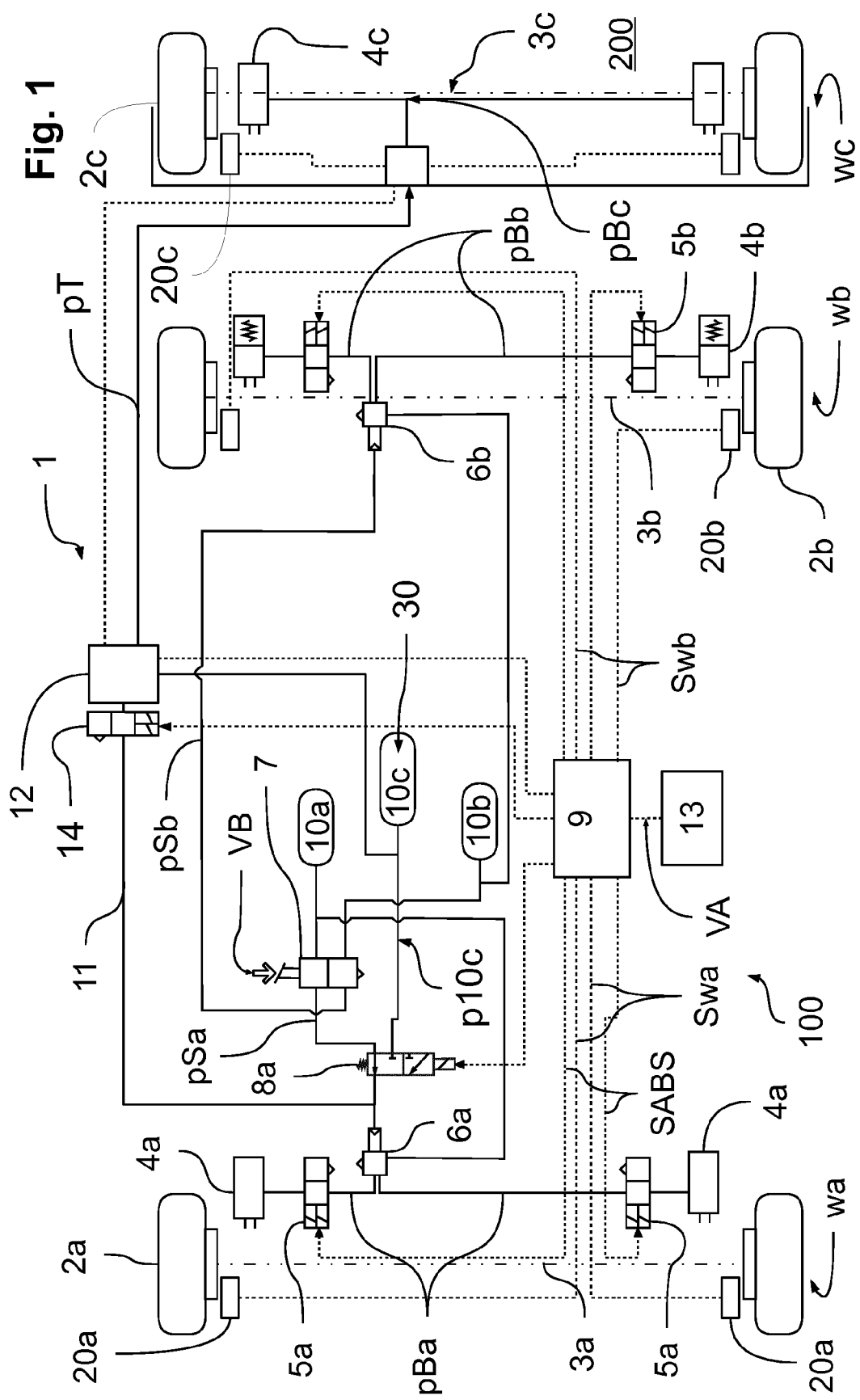
FIG. 1 shows an ABS brake system with a front-axle switching valve.

In an embodiment, the present invention provides a method with which monitoring of an implementation of an automated braking specification can take place in a simple and reliable way. Furthermore, an object of the invention is to specify a brake system for carrying out the method.

According to the invention there is accordingly provision to detect an actual dynamics variable and a reference dynamics variable in order to monitor an implementation of an assistance braking specification, which is requested in an automated fashion, in a brake system, preferably an ABS brake system, in a vehicle, preferably a utility vehicle, wherein the actual dynamics variable characterizes wheel dynamics of at least one wheel of the vehicle and/or of the trailer at which the assistance braking specification which is requested in an automated fashion is to be implemented, and the reference dynamics variable specifies current driving dynamics of the entire vehicle with a possibly coupled trailer. According to the invention, these two dynamics variables are compared with one another in order to determine whether there is a difference between the current wheel dynamics of the respective wheel and the current driving dynamics of the entire vehicle. According to the invention, in this case faultfree implementation of the assistance braking specification is inferred if the actual dynamics variable deviates, taking into account a noise deviation, at least temporarily from the reference dynamics variable by a pulse deviation.

On the other hand, faulty implementation of the assistance braking specification which is requested in an automated fashion can be assumed if the actual dynamics variable does not deviate, taking into account the noise deviation, from the reference dynamics variable by a pulse deviation, and the wheel dynamics of the respective wheel therefore correspond to the driving dynamics of the entire vehicle within the noise deviation of the assistance braking specification if an assistance braking specification is present.

According to the invention, the effect is therefore utilized that in the case of a braking operation which is carried out in an automated fashion in an ABS system, as a result of which a service-brake brake pressure at vehicle service brakes on the vehicle and/or at trailer service brakes on a possible coupled trailer rises or falls, the wheel dynamics of the wheels of the vehicle and/or of the trailer which are to be braked as a result deviate as expected from driving dynamics of the entire vehicle with a possibly coupled trailer. In order to detect such deviation, the corresponding dynamics variables which are detected in the current driving situation can easily be evaluated. There is therefore advantageously no pressure sensor necessary but rather preferably only wheel speed sensors for detecting the actual dynamics variables or the current wheel dynamics of the respective wheel on the vehicle and/or on the trailer and/or a speed sensor and/or acceleration sensor for detecting the reference dynamics variables or the current driving dynamics of the vehicle with a possibly coupled trailer.

In this context, an actual wheel speed and/or an actual wheel acceleration are/is preferably used as an actual dynamics variable, with which actual wheel speed and/or actual wheel acceleration the current wheel dynamics of the respective wheel can be specified. The actual wheel acceleration follows here from the actual wheel speed by forming the mathematical derivation. It is therefore possible to use easily accessible variables for characterizing the wheel dynamics, which variables can be measured with sensors which are present in any case in the vehicle and/or in the trailer so that no components have to be retrofitted.

A current vehicle actual acceleration and/or a current vehicle actual speed and/or a mean value of the actual dynamics variable plotted against the time can preferably be used as the reference dynamics variable. These variables also constitute easily accessible variables in the vehicle which specify a current behavior of the vehicle dynamics of the entire vehicle with a possibly coupled trailer. When the mean value is formed from the actual dynamics variable it is possible to make use of the fact that the actual dynamics variable corresponds approximately to the reference dynamics variable when the service-brake brake pressure remains the same. Small deviations, e.g. during a pressure rise or pressure drop in the service-brake brake pressure or owing to measuring noise which is characterized by the noise deviation can be filtered by forming the mean value, so that the mean value can also be used in a good approximation as a reference dynamics variable and therefore it is possible to estimate whether a pulse deviation is present or not even without recourse to additional sensors.

The evaluation of the actual dynamics variables can preferably take place on an axle basis and/or on a wheel basis. If, for example, actuation of the vehicle service brakes and/or of the trailer service brakes on an axle basis is provided owing to an assistance braking specification, it may be sufficient to determine the actual dynamics variable only for one wheel of this vehicle axle and/or trailer axle and to compare it with the reference dynamics variable. In order to improve the accuracy, it is, however, also possible for axle-based consideration to take place via a mean value of the actual dynamics variable acting at the respective vehicle axle and/or trailer axle, or for the actual dynamics variable for both wheels of one vehicle axle and/or trailer axle to be evaluated separately. In order to check the plausibility, the actual dynamics variable of one vehicle axle which is actuated by the assistance braking specification and/or trailer axle can also be compared with an actual dynamics variable of a non-actuated vehicle axle and/or trailer axle.

The evaluation of the pulse deviation is carried out by determining whether the actual dynamics variable deviates from the reference dynamics variable by a specific pulse deviation. In order to obtain a reliable result, it is necessary to take into account measuring noise which is characterized by the noise deviation, wherein the noise deviation specifies the extent to which the measured values which specify the wheel dynamics, i.e. in particular the actual wheel speed, deviate from the mean value only owing to a measurement which has been carried out, as a result of interference or the like.

Accordingly, a pulse deviation is defined as a deviation of the actual dynamics variable from the reference dynamics variable which goes beyond the noise deviation, in order to ensure that the difference between the reference dynamics variable and the actual dynamics variable is not caused by the measuring noise itself. In order also to rule out outliers in the measurement, the pulse deviation corresponds at least to twice the noise deviation.

The deviation of the dynamics variables is caused, as already described, preferably only when there is a rapid change in the service-brake brake pressure, i.e. a rise or a drop in the service-brake brake pressure, owing to an assistance braking specification which is present, wherein in order to implement the assistance braking specification which is requested in an automated fashion the service-brake brake pressure is increased or reduced incrementally, preferably by means of pulsed actuation. This incremental rise in the service-brake brake pressure is then applied to the vehicle service brakes of the corresponding wheels of the vehicle and to the trailer service brakes of a possibly coupled trailer.

It is thus possible to determined for each step in the service-brake brake pressure, i.e. for each pulsed actuation, whether the actual dynamics variable deviates from the reference dynamics variable, wherein during the evaluation it is also possible to take into account the number of pulses in which an increase or a reduction in the service-brake brake pressure takes place, and whether the same number of pulse deviations can be detected during the execution of the assistance braking specification. This is because owing to the incremental increasing or reducing of the service-brake brake pressure at the respective wheel the pulse deviation should occur for each step, insofar as the service-brake brake pressure exceeds a triggering pressure of the respective vehicle service brake or trailer service brake.

The magnitude of the pulse deviation can also be dependent on the magnitude of the service-brake brake pressure, wherein the pulse deviation becomes greater as the service-brake brake pressure rises. As a result, a further influencing variable can be taken into account during the monitoring, in order to make the evaluation more reliable.

According to one preferred embodiment, incremental increasing of the service-brake brake pressure at the vehicle service brakes for implementing the assistance braking specification is brought about by actuating ABS control valves of the ABS brake system and by switching a switching valve from a first switching-valve switched position into a second switching-valve switched position. Accordingly, if an assistance braking specification is present with which an increase in the braking effect is requested, the switching valve is switched into the second switching-valve switched position in which a pressure medium is released from a multi-purpose pressure medium reservoir. As a function thereof, a service-brake brake pressure is firstly applied, and before said service-brake brake pressure passes to the respective vehicle service brake it is set, via the ABS control valves, to a value which is necessary to implement the assistance braking specification, wherein for this purpose recourse is made to characteristic curves. That is to say no pressure control takes place via the ABS control valves using a pressure sensor. The service-brake brake pressure is adapted here by actuating inlet valves and outlet values in the ABS control valve, which valves can ensure in a known fashion that the service-brake brake pressure can be reduced, held or increased.

If an assistance braking specification is present with which a reduction in the braking effect is requested, i.e. incremental reduction in the service-brake brake pressure which currently acts in the brake cylinders of the vehicle service brakes is necessary, the switching valve is also switched into the second switching-valve switched position, and the ABS control valve correspondingly ensures incremental bleeding of the vehicle service brakes by pulsed opening of the outlet valve in the ABS control valve. The service-brake brake pressure can therefore be reduced incrementally via the ABS control valves to a value which is necessary to implement the assistance braking specification. No pressure control takes place here via the ABS control valves using a pressure sensor.

If it is detected in the method according to the invention, by comparing the dynamics variables, that there is no faultfree implementation of the assistance braking specification when a request to increase or reduce the pressure occurs, it can preferably be inferred that there is a mechanical defect in the switching valve or in the ABS control valve, in particular in the outlet valve in the ABS control valve, if an electrical defect has not previously been detected in the brake system. That is to say in order to increase pressure, the switching valve cannot be switched into the second switching-valve switched position, and accordingly the pressure medium cannot be made available from the multi-purpose pressure medium reservoir in order to increase the pressure at the service brakes via the ABS control valves, so that there also cannot be a change in the wheel dynamics and therefore there also cannot be any deviation of the actual dynamics variable from the reference dynamics variable. Accordingly, when there is a request to reduce the pressure and there is a mechanical defect in the outlet valve, the respective vehicle service brake cannot be bled via said outlet valve in the second switching-valve switched position of the switching valve in order to reduce the service-brake brake pressure acting in the vehicle service brakes.

Therefore, it is easily possible to infer, without recourse to a pressure sensor in the ABS brake system, that there is a mechanical defect in the switching valve and/or in the ABS control valve, in particular in the output valve of the ABS control valve, and therefore that there is faulty implementation of the assistance braking specification. If it is detected in such a monitoring operation that there is a defect present, the driver can be correspondingly warned via a warning signal and, if appropriate, a currently implemented assistance braking specification can be aborted.

In the second switching-valve switched position the switching valve ensures here that the pressure medium is fed from the multi-purpose pressure medium reservoir to a relay valve of the brake system which outputs, as a function thereof, a service-brake brake pressure with a boosted air quantity to the vehicle service brakes of the vehicle, which service-brake brake pressure can be influenced in advance in a corresponding way—as described above—by the ABS control valves. In contrast, in a first switching-valve switched position a service-brake control pressure which is output by a service brake valve is passed on to the relay valve, wherein the service-brake control pressure is dependent on a service-brake braking specification which is preferably specified manually by the driver. In this first switching-valve switched position the ABS control valves preferably serve merely to implement a traction control operation.

In order to implement the assistance braking specification in the trailer, depending on the switching-valve switched position either the pressure medium from the pressure medium reservoir or else the service-brake control pressure, which is for example also applied to a front axle, is transmitted via a trailer pressure line to a trailer control valve which transmits said service-brake control pressure to a separate trailer brake system in the trailer, which separate trailer brake system actuates, in response thereto, the trailer service brakes to a corresponding extent. Furthermore, a pressure control valve, which is of the same design as the ABS control valves upstream of the vehicle service brakes and correspondingly also contains an inlet valve/output valve combination is arranged in the trailer pressure line.

When an assistance braking specification is present, the switching valve is accordingly switched into the second switching-valve switched position when an increase in pressure is requested, and the pressure from the pressure medium reservoir is adapted in accordance with the assistance braking specification and transmitted to the trailer control valve by corresponding actuating the inlet valves and outlet valves in the pressure control valve. The outlet valve in the pressure control valve is correspondingly actuated in order to reduce the pressure.

In a comparable way to what is described above with respect to the vehicle, an actual dynamics variable can accordingly also be detected for the trailer in that the wheel rotational behavior of the wheels on the trailer which implement the assistance braking specification is detected via trailer rotational speed sensors which are arranged on the trailer. Said actual dynamics variable can be compared with the reference dynamics variable which specifies the driving dynamics of the entire vehicle including the trailer, and therefore when there is no deviation a possible mechanical defect in the switching valve and/or in the pressure control valve, in particular in the output valve in the pressure control valve can be inferred.

The ABS control valves, the pressure control valve in the trailer pressure line and the switching valve are controlled electrically by a central module which is also suitable for carrying out the method according to the invention as described above for monitoring the implementation of the assistance braking specification which is requested in an automated fashion.

According to FIG. 1, a vehicle 100 with a brake system 1 is illustrated, wherein the brake system 1 is embodied as an ABS brake system. Accordingly, front wheels 2a on a front axle 3a and at rear wheels 2b on a rear axle 3b can be braked via vehicle service brakes 4a, 4b, upstream of which ABS control valves 5a, 5b are respectively connected. A relay valve 6a, 6b is connected upstream of the ABS control valves 5a, 5b in the pressure path on an axle basis, said relay valves 6a, 6b applying a service-brake brake pressure pBa, pBb to the vehicle service brakes 4a, 4b on the respective vehicle axle 3a, 3b, via the ABS control valves 5a, 5b.

The magnitude of the service-brake brake pressure pBa, pBb which is applied to the respective vehicle axles 3a, 3b is determined here by the driver who requests a service-brake braking specification VB via a dual-circuit service brake valve 7, as a result of which a service-brake control pressure pSa, pSb is generated in the service brake valve 7 and output to the relay valves 6a, 6b on the respective vehicle axles 3a, 3b. According to FIG. 1, this occurs in a direct fashion for the rear axle 3b and via a front-axle switching valve 8a for the front axle 3a. The service-brake control pressure pSa, pSb is output in the known fashion with boosting of the air quantity and as a service-brake brake pressure pBa, pBb to the vehicle service brakes 4a, 4b by the relay valves 6a, 6b on the respective vehicle axle 3a, 3b. The pressure medium in the respective brake circuit is made available from pressure medium reservoirs 10a, 10b which are assigned to the respective vehicle axle 3a, 3b.

The ABS control valves 5a, 5b, which are respectively connected upstream of the vehicle service brakes 4a, 4b, can be actuated electrically on a wheel-specific basis by a central module 9 of the brake systems 1 via ABS control signals SABS. As a result, the service-brake brake pressure pBa, pBb which is output by the relay valves 6a, 6b can be adapted in a situation-dependent and wheel-specific fashion in order to cause, in particular within the scope of a brake slip control operation (ABS) or a traction control operation (ASR), the service-brake brake pressure pBa, pBb which is output by the relay valve 6a, 6b to be maintained or reduced. The service-brake brake pressure is adapted here via an inlet valve/outlet valve combination in the respective ABS control valve 5a, 5b which combination can ensure, through corresponding electrical actuation, that the acting service-brake brake pressure pBa, pBb at the vehicle service brakes 4a, 4b can be maintained or reduced. In order to bring about such control, a wheel rotational behavior of the wheels 2a, 2b is measured on a wheel-specific basis by means of vehicle wheel speed sensors 20a, 20b and determined wheel speeds wa, wb for each wheel 2a, 2b are communicated via wheel speed signals Swa, Swb to the central module 9 which processes said signals and actuates the ABS control valves 5a, 5b as a function thereof in a corresponding control operation.

Furthermore, an increase in the front-axle service-brake brake pressure pBa can also be brought about via the additional front-axle switching valve 8a in the brake system 1 according to FIG. 1, under the control of the central module 9 via the front-axle ABS control valves 5a, as is described below.

The front-axle switching valve 8a is for this purpose embodied according to FIG. 1 as a 3/2-way valve which, in a first switching-valve switched position X1, connects the service brake valve 7 to a pneumatic control input of the front-axle relay valve 6a, so that in the first switching-valve switched position X1 the service-brake braking specification VB which is requested by the driver is converted by the front-axle relay valve 6a into a front-axle service-brake brake pressure pBa. Accordingly, the service-brake braking specification VB is also converted by the rear-axle relay valve 6b into a rear-axle service-brake brake pressure pBb.

In a second switching-valve switched position X2, a multi-purpose pressure medium reservoir 10c, which can be used, for example, for controlling trailer service brakes 4c in a trailer 200 or else for a parking brake circuit (not illustrated) is connected to the front-axle relay valve 6a, so that the front-axle service-brake brake pressure pBa is defined as a function of a multi-purpose pressure medium pressure p10c, prevailing in the multi-purpose pressure medium reservoir 10c, of a multi-purpose pressure medium 30 which is located therein. So that in the second switching-valve switched position X2 a maximum braking effect, which would occur owing to the high multi-purpose pressure-medium pressure p10c in the multi-purpose pressure medium reservoir 10c is not obtained via the front-axle service brakes 4a, it is possible for a controlled, graduated pressure buildup to be carried out with the multi-purpose pressure medium 30 from the multi-purpose pressure medium reservoir 10c under the control of the central module 9 via the front-axle ABS control valves 5a, in that the front-axle ABS control valves 5a, and/or the inlet valves or outlet valves installed therein, are actuated depending on the desired braking effect, until the intended braking effect is brought about.

By setting this second switching-valve switched position X2 it can be ensured, in particular, that in the illustrated brake system 1, an ABS brake system, a braking request which is communicated electrically to the central module 9, referred to below as an assistance braking specification VA, can also be implemented via the front-axle service brakes 4a. The assistance braking specification VA is specified according to this embodiment via a driving assistance control module 13, which is, for example, part of a rollover preventer (RSC), an adaptive cruise control system (ACC) or an emergency brake system (AEBS) which can generate an assistance braking specification VA in an automated fashion in a corresponding driving situation and transmit it to the central module 9, in order to bring about braking via the front-axle service brakes 4a within the scope of a control strategy which relates to the respective driving assistance control module 13.

This braking operation is then implemented via the front-axle switching valve 8a which, when, such an assistance braking specification VA which is specified in an automated fashion is present, is switched into the second switching-valve switched position X2 by the central module 9 in order to actuate the front-axle relay valve 6a pneumatically with the multi-purpose pressure medium 30 from the multi-purpose pressure medium reservoir 10c. The front-axle service-brake brake pressure pBa which is applied in response by the front-axle relay valve 6a is subsequently limited, given the presence of a request to increase pressure, to a corresponding pressure also under the control of the central module 9 via the front-axle ABS control valves 5a in accordance with the assistance braking specification VA, and said pressure is applied to the front-axle service brakes 4a in order to achieve a braking effect, corresponding to the assistance braking specification VA, via the front-axle service brakes 4a.

However, if a pressure reduction is requested via the assistance braking specification VA, the front-axle switching valve 8a is also moved into the second switching-valve switched position X2, but the front-axle ABS control valve 5a is then actuated in such a way that the front-axle service brakes 4a are bled, and the front-axle service-brake brake pressure pBa which is applied by the front-axle relay valve 6a is not fed through to the front-axle service brakes 4a. This is done by opening the outlet valve in the front-axle ABS control valve 5a while the inlet valve of the front-axle ABS control valve 5a is simultaneously closed.

In a corresponding way, there can additionally or alternatively be provision for the rear-axle relay valve 6b to have a rear-axle switching valve 8b connected upstream of it (see FIG. 3) in order also to be able to brake the rear axle 3b via the rear-axle service brakes 4b in accordance with the assistance braking specification VA.

When a first switching-valve switched position X2 is set, the front-axle control pressure pSa which is applied by the dual-circuit service brake valve 7 as a result of the service-brake braking specification VB is additionally also output via a trailer pressure line 11 to a trailer control valve 12, so that the front-axle service-brake control pressure pSa which is provided for actuating the front-axle service brakes 4a via the front-axle relay valve 6a can be simultaneously transmitted as a trailer control pressure pT via the trailer control valve 12 to an indicated brake system in the trailer 200 with trailer service brakes 4c.

At the same time, the assistance braking specification VA in the trailer 200 can also be implemented via an additional pressure control valve 14 in the trailer pressure line 11. The pressure control valve 14 has here a comparable design to the ABS control valves 5a, 5b, i.e. inlet valves and outlet valves are provided which can ensure that the pressure which is output by the front-axle switching valve 8a can be increased, maintained and reduced. Accordingly, in the second switching-valve switched position X2 of the front-axle switching valve 8a it is possible, as already described, for the multi-purpose pressure p10c of the multi-purpose pressure medium 30 which is transmitted from the multi-purpose pressure medium reservoir 10c to the trailer control valve 12 to be adapted and, if appropriate, also for a reduction in pressure to be brought about via the outlet valve in the pressure control valve 14, in order to implement the assistance braking specification VA.

Therefore, a braking effect which corresponds to the present braking specification Va, VB can also be brought about in the trailer 200 via the trailer service brakes 4c. In this exemplary embodiment, the trailer 200 is braked in an identical fashion or, if appropriate, in a scaled fashion like the front axle 3a.

The pneumatic actuation of the front-axle service brakes 4a via the front-axle ABS control valves 5a on the basis of such an assistance braking specification VA which is specified in an automated fashion takes place without the use of pressure sensors in the ABS brake system 1. That is to say, electrical actuation corresponding to the assistance braking specification VA, of the front-axle switching valve 8a and of the front-axle ABS control valves 5a is carried out for which, for example according to parameterization carried out above, a specific braking effect is expected. However, control as a function of an actually applied front-axle service-brake brake pressure pBa does not take place. Therefore, in particular the central module 9 cannot determine which front-axle service-brake brake pressure pBa is actually applied to the front-axle service brakes 4a, and therefore whether the assistance braking specification VA is also actually implemented. The same applies to the trailer service brakes 4c.

The implementation can also fail to occur here, for example, as a result of a mechanical defect in the front-axle switching valve 8a, i.e. the front-axle switching valve 8a cannot be moved, or cannot be moved completely, into the second switching-valve switched position X2, so that a buildup of pressure cannot be ensured. At the same time, the front-axle ABS control valve 5a, in particular the outlet valve, can also have a mechanical defect therein, so that a reduction of pressure in the front-axle service brakes 4a on the basis of the assistance braking specification VA cannot also be ensured. This can give rise to instabilities in the vehicle 100 and/or in the trailer 200, since a failure of implementation or inadequate implementation at the front axle 3a in the brake system 1 according to FIG. 1 can also lead to a failure of implementation at the trailer 200 via the trailer service brakes 4c. If a braking operation cannot take place to the required extent within the scope of the corresponding stability control, this can lead, for example during cornering, to jackknifing of the trailer 200 or of lateral veering off of the vehicle 100 and/or of the trailer 200.

In order to detect such a mechanical defect of the front-axle switching valve 8a which is set on a standard basis to the first switching-valve switched position X1 and/or of the front-axle ABS control valve 5a and/or, if appropriate, of the pressure control valve 14, in particular of the outlet valves contained therein, without using a pressure sensor in the brake system 1, in a method according to the invention there is provision that after the presence of an assistance braking request VA in the central module 9 has been detected and the front-axle switching valve 8a has been correspondingly switched, it is evaluated how the wheel dynamics of the front wheels 2a are specifically behaving as a result of the actuation of the front-axle switching valve 8a. This is done by using the wheel speed sensors 20a which are arranged on the front wheels 2a and with which the wheel rotational behavior of the front wheels 2a can be detected on a wheel-specific basis. Furthermore, there can also be provision to include also the wheel dynamics of the trailer wheels 2c on which trailer wheel speed sensors 20c are arranged and via which trailer wheel speeds wc can be detected, since these should react to the braking operation in a way which is comparable to the front wheels 2a. However, in the text which follows the method is described only for the vehicle 100 for the sake of simplicity.

In order therefore to be able to infer that there is a mechanical defect in the front-axle switching valve 8a and/or in the front-axle ABS control valve 5a, when an assistance braking request VA is present the wheel dynamics of the front wheels 2a are detected as a function of the front-axle actual wheel speeds wa_Ist which are currently measured via the front-axle wheel speed sensors 20a, which wheel dynamics are set owing to the switching of the front-axle switching valve 8a into the second switching-valve switched position X2 and as a result of the corresponding actuation of the front-axle ABS control valves 5a. In this context, the wheel dynamics of just one of the front wheels 2a can also occur, said front wheel 2a being braked as a result of the switching of the front-axle switching valve 8a and of the front-axle ABS control valve 5a which is respectively connected upstream. Alternatively, a mean value formed from both braked front wheels 2a, 2b can also be formed.

The detected and evaluated wheel dynamics are therefore always assigned to the respective vehicle axle 3a, 3b, since the wheel rotational behavior of the front wheels 2a during a braking operation via the front axle 3a differs from the wheel rotational behavior of the rear wheels 2b when only the front axle 3a is braked. Therefore, by means of this axle-based assignment it is possible to differentiate between the vehicle axle 3a, 3b at which braking has been carried out via the switching valve 8a, 8b, and a vehicle axle 3a, 3b via which braking has not been carried out actively when an assistance braking specification VA is present.

The front-axle actual wheel speed wa_Ist which is currently measured when an assistance braking specification VA is present is used in the text which follows to determine a front-axle actual dynamics variable which specifies how the wheel dynamics of the front wheels 2a of the vehicle 100 behave or change when assistance braking specification VA is present. In this context, in the simplest case the measured front-axle actual wheel speed wa_Ist can be used directly as a front-axle actual dynamics variable, or else a front-axle wheel acceleration dwa_Ist can be determined from the front-axle actual wheel speed wa_Ist, said front-axle wheel acceleration dwa_Ist following from the mathematical derivation of the front-axle actual wheel speed wa_Ist which specifies a speed of the respective front wheel 2a. Alternatively it is also possible to start from any other desired variable which characterizes the actual wheel speed wa_Ist. Therefore it is possible to determine for each front wheel 2a how the front wheels 2a react to the electrically specified assistance braking specification VA.

In an analogous fashion, a rear-wheel actual wheel speed wb_Ist can be determined via the rear-wheel wheel speed sensors 20b and/or a rear-axle actual wheel acceleration dwb_Ist can be determined from said wheel speed, or a variable which characterizes said wheel acceleration can be determined as a rear-axle actual dynamics variable, in order to detect the reaction of the rear wheel 2b to the assistance braking specification VA if e.g. a rear-axle switching valve 8b is arranged upstream of the rear-axle relay valve 6b and/or in order to determine the difference in the reaction between the front axle 3a and the rear axle 3b. Furthermore, a trailer actual wheel speed wc_Ist can be determined via the trailer wheel speed sensors 20c, and/or a trailer actual wheel acceleration dwc_Ist can be determined from said wheel speed or a variable which characterizes said wheel acceleration can be determined as a trailer actual dynamics variable, in order to detect the reaction of the trailer wheels 2c to the assistance braking specification VA.

In order to determine the, in particular, mechanical functional capability of the respective switching valve 8a, 8b, the actual dynamics variable which is determined via the actual wheel speeds wa_Ist, wb_Ist, wc_Ist for the respective wheel 2a, 2b, 2c is compared with a reference dynamics variable as follows:

For example, for this purpose a qualitative time profile of the front-axle service-brake brake pressure pBa is shown in FIG. 2a, which time profile is set, under the control of the central module 9 via the front-axle ABS control valves 5a, at the front-axle service brakes 4a in order to implement the assistance braking specification VA via one or both front wheels 2a. The rise in the front-axle service-brake brake pressure pBa occurs here incrementally on the basis of pulsed actuation of the front-axle ABS control valves 5a or the inlet valves contained therein, wherein according to this embodiment four steps S1, S2, S3, S4 are present at different times t1, t2, t3, t4.

In FIG. 2b, the reaction of the vehicle 100 is contrasted with the front-axle service-brake brake pressure pBa illustrated in FIG. 2a, wherein for this purpose according to this embodiment the profile of the front-axle actual wheel acceleration dwa_Ist and the profile of a vehicle actual acceleration aIst are plotted qualitatively against the time t. Since the determined front-axle actual wheel speed dwa_Ist has a certain amount of noise, a time mean value Ma is also formed, which corresponds approximately here to the vehicle actual acceleration aIst. The front-axle actual wheel acceleration dwa_Ist is illustrated with a certain noise deviation R as a continuous line plotted against the time t distributed about this time mean value Ma, wherein the noise deviation R is mainly characterized by the noise, i.e. a deviation in the front-axle actual wheel acceleration dwa_Ist, which is caused by the measurement itself, from the mean value Ma.

During a braking process or else in the unbraked state it is to be expected that the front-axle actual wheel acceleration dwa_Ist corresponds, while taking into account the noise deviation R, approximately to the vehicle actual acceleration aIst, since rotating front wheels 2a ensure that there is a corresponding change (braked or accelerated state) or else there is no change (unbraked state) of the driving dynamics, i.e. of a vehicle actual speed vIst, of the entire vehicle 100. The mean value Ma should therefore correspond tangentially to the vehicle actual acceleration aIst. This is the case over a long time period for the braking process in FIGS. 2a and 2b. However, in contrast to this, the time profile of the reaction of the vehicle 100 in FIG. 2b also shows that at certain times t2, t3, t4 at which a sudden buildup of front-axle service-brake brake pressure pBa takes place, the front-axle actual wheel acceleration dwa_Ist deviates from the vehicle actual acceleration aIst or else from the mean value Ma several times by a pulse deviation P which goes beyond the noise deviation R and which is not caused by the noise itself. That is to say at these times t2, t3, t4 that the respective front wheel 2a has different dynamics than the vehicle 100 itself.

Therefore, the presence of a certain pulse deviation P can be assumed to be characteristic, in particular, for a braking operation which is carried out in a pulsed fashion via the front-axle ABS control valves 5a if the front-axle switching valve 8a is in the second switching-valve switched position X2. If the rear axle 3b is braked via the rear-axle switching valve 8b, or a further vehicle axle is braked via a further switching valve, this is correspondingly considered to be characteristic of a pulsed braking operation at the rear axle 3b via the rear-axle ABS control valves 5b or at the further vehicle axle via the ABS control valves which are assigned to this vehicle axle. The same applies in the case of braking of the trailer axle 3c via the trailer service brakes 4c, for which a comparable behavior of the trailer actual wheel acceleration dwc_Ist is to be excepted via the trailer wheel speed sensors 20c, if the pressure control valve 14 is actuated in a pulsed fashion by the central module 9 in FIG. 1, in order to specify a corresponding trailer control pressure pT which ensures at a likewise stepped specification of a service-brake control pressure pBc at the trailer service brakes 4c. For this purpose, the actual wheel speeds of the wheels are then to be evaluated in a corresponding way at the respective vehicle axle.

The presence of a pulse deviation P represents here a typical braking behavior during pulsed braking operations, since when there is an abrupt change in the service-brake brake pressure pBa, pBb, pBc, for example when there is an abrupt rise in pressure or when there is an abrupt reduction in pressure, the tire of the respective wheel 2a, 2b, 2c must first travel a specific rolling distance so that the circumferential forces in the tire contact area and therefore the respective wheel speed wa, wb, wc and the acceleration of the wheel again assume a static state. That is to say the rubber profile of the tire must enter a new state of elastic deformation at the moment of the sudden increase in the frictional force which is to be transmitted in the tire contact face. As a result of the fact that the old state of elastic deformation cannot transmit the new frictional force, a locally increased deformation occurs in the wheel contact area, and therefore a brief high slip and/or a high negative acceleration occurs/occur. If the tire then rolls a certain distance, the new frictional force and the new elastic deformation are distributed uniformly over the entire wheel contact area and are again in a static state so that the front-axle actual wheel acceleration dwa_Ist corresponds again approximately to the vehicle actual acceleration aIst.

The vehicle actual acceleration aIst or the time mean value Ma can therefore serve here as a reference dynamics variables via which it is possible to ascertain whether a difference goes between the wheel dynamics and the vehicle dynamics at the respective wheels 2a, 2b, 2c as a result of the assistance braking specification VA. In the profile which is illustrated in FIG. 2b, such a difference occurs for the front axle 3a at the times t2, t3, t4 at which the front-axle actual dynamics variable dwa_Ist deviates from said reference dynamics variable, i.e. the vehicle actual acceleration aIst, by a certain pulse deviation P. At the first time t1, the pulse deviation P is absent in FIG. 2b, since a response pressure of the respective front-axle service brake 2a could not yet be exceeded by the first step S1 in the front-axle service-brake brake pressure pBa, and accordingly a change cannot occur in the wheel dynamics.

Therefore, by evaluating the corresponding dynamics variables dwa_Ist, aIst it is possible to detect from the time profile in FIG. 2b whether, when an assistance braking specification VA is present by which an incremental rise in the front-axle service-brake brake pressure pBa is brought about under the control of the central module 9 via the front-axle ABS control valves 5a and the front-axle switching valve 8a, a specific number A of pulse deviations P occurs. It is then possible to infer from this whether the respective assistance braking specification VA has also actually been brought about at this front wheel 2a. In this context it is also possible to test, for example, on the basis of the number of steps S1, S2, S3, S4 in the front-axle service-brake brake pressure pBa, i.e. the number of actuation pulses to the respective front-axle ABS control valve 5a, whether this number corresponds to the number A of pulse deviations P or whether an unacceptable deviation is present.

Therefore, if, for example, the case occurs that, when an assistance braking specification VA is present, no such pulse deviation P can be detected in the front-axle actual dynamics variable dwa_Ist, it can be inferred that the assistance braking specification VA has not been implemented by the front-axle service brakes 4a, and accordingly there is a high probability that a mechanical defect is present in the front-axle switching valve 8a which is assigned to the front axle 3a.

However, before drawing such a conclusion it is necessary to clarify whether an electrical defect is already present, for example during the actuation of the front-axle switching valve 8a via the central module 9 or in the central module 9 itself. This can take place, for example, within the scope of self-diagnostics which are carried out in the background.

FIG. 2c shows, for the braking operation according to FIGS. 2a and 2b, the comparison of the front-axle actual wheel speeds wa_Ist as a front-axle actual dynamics variable with the vehicle actual speed vIst as a reference dynamics variable, wherein the vehicle actual speed vIst can be ascertained by means of a position ascertaining system, e.g. GPS, or by means of a mathematically integrated longitudinal acceleration aIst, in order to achieve improved comparability. A pulse deviation P between the two profiles can also be detected at certain times here, since the front-axle actual wheel speeds wa_Ist drop slightly for each rise in pressure, while the vehicle actual speed vIst remains virtually unaffected thereby. Therefore, the presence of a certain pulse deviation P in the front-axle actual wheel speeds wa_Ist can already be assumed as being characteristic, in particular, of a braking operation which is carried out in a pulsed fashion via the front-axle ABS control valves 5a, if the front-axle switching valve 8a is in the second switching-valve switched position X2.

The same also applies to the respective other vehicle axles and to the trailer 200.

FIGS. 2a, 2b, 2c show the behavior of the dynamics variables for a pressure rise. The same also applies to a pressure drop resulting from a requested reduction in the braking effect via the assistance braking specification VA. A pulse deviation P also occurs then, which pulse deviation P can be correspondingly measured if incremental reduction in the front-axle service-brake brake pressure pBa takes place by bleeding the front-axle service brakes 4a via the outlet valves into the front-axle ABS control valves 5a. If it becomes apparent during the evaluation that the pulse deviation P is not present, it can therefore be inferred therefrom that there is a mechanical defect in the front-axle ABS control valve 5a or in the outlet valve contained therein.

The same also applies to the respective other vehicle axles and to the ABS control valves which are assigned thereto, as well as to the trailer 200 and to the pressure control valve 14 which is assigned to the latter.

The evaluation of the wheel dynamics and of the vehicle dynamics can additionally also take place over multiple axles in that it is ascertained, for example, whether when an assistance braking specification VA is present which occurs via the front-axle switching valve 8a, the front-axle actual wheel speeds waist or the front-axle actual wheel acceleration dwaIst has a comparable time profile to the rear-axle actual wheel speed wbIst or the rear-axle actual wheel acceleration dwbIst. If that is the case it is to be expected that when there is a braking operation only at the front axle 3a, only a pulse deviation P for the front-axle actual dynamics variable dwaIst, waist, as described above, also occurs. In contrast, the rear-axle actual dynamics variable dwbIst, wbIst should correspond essentially to the reference dynamics variable aIst, vIst, since the rear wheels 2b are not braked. However, if a rear-axle switching valve 8b is assigned to the rear axle 3b, when a corresponding switching operation occurs into the second switching-valve switched position X2 and there is an assistance braking specification VA present, a pulse deviation P will thus also occur at the rear-axle actual dynamics variable dwbIst, wbIst if there is no mechanical defect present in the rear-axle switching valve 8b.

In addition, the degree or the magnitude of the pulse deviation P, in particular also in relation to the noise deviation R, can also be taken into account for the evaluation of the pulse deviation P. This makes it possible to take in account when there are relatively large changes in pressure, i.e. relatively long actuation times of the respective ABS control valve 5a, 5b or when there are relatively high service-brake brake pressures pBa, pBb, pBc a relatively large pulse deviation P occurs, since this has a greater effect of the wheel dynamics.

Figure 3:
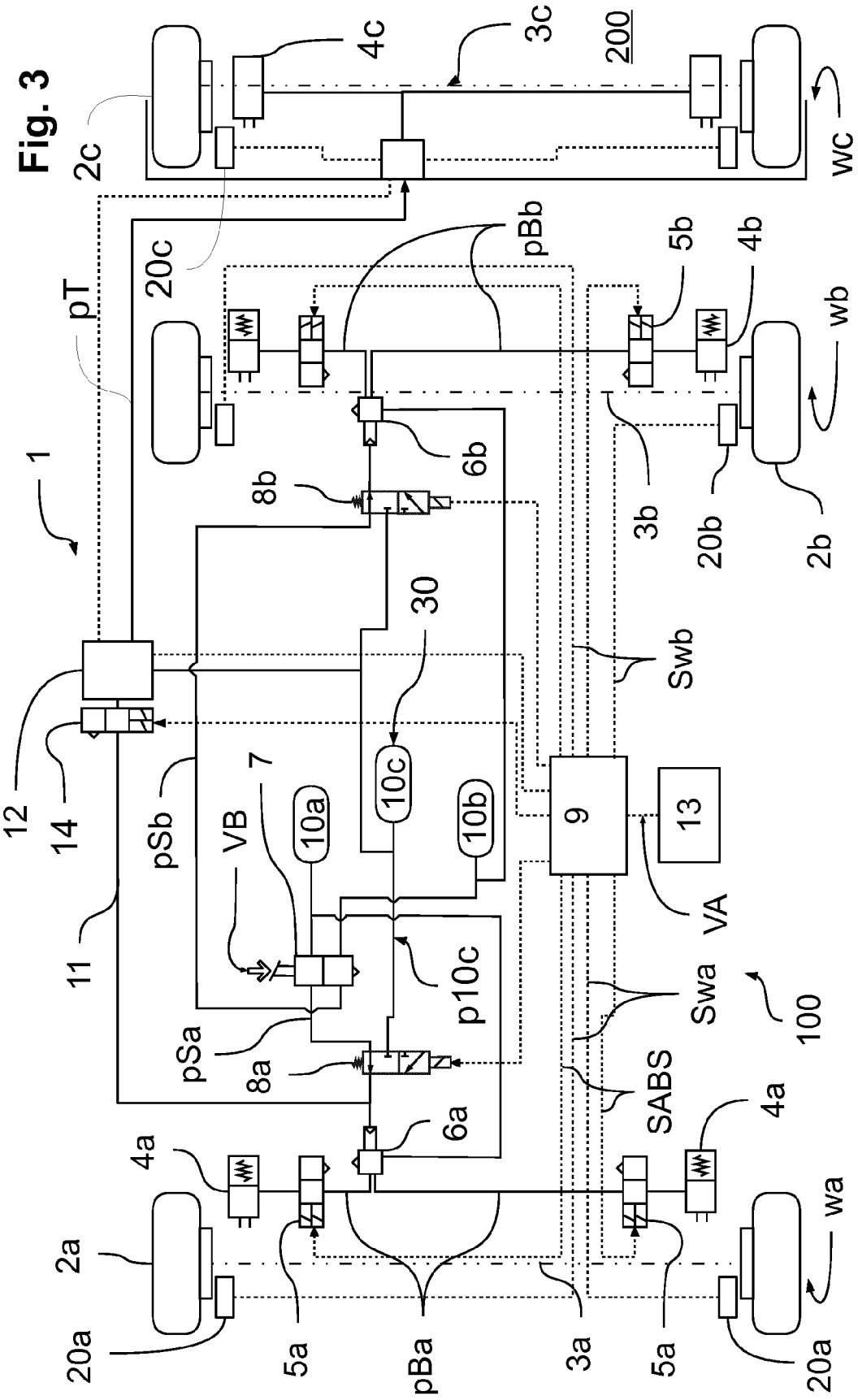
FIG. 3 shows an ABS brake system with two switching valves.

FIG. 3 illustrates the brake system 1 with two switching valves 8a, 8b, which brake system 1 differs from FIG. 1 only in that a rear-axle switching valve 8b is also arranged on the rear axle 3b, which rear-axle switching valve 8b ensures, as already described, that the assistance braking specification VA can also be implemented at the rear axle 3b. Alternatively, a rear-axle switching valve 8b can also be arranged only on the rear axle 3b, and there may be no front-axle switching valve 8a arranged on the front axle 3a, wherein the trailer pressure line 11 is then to be fed from the rear axle 3b to the trailer control valve 12, in order also to be able to bring about an automated braking operation according to the assistance braking specification VA in the trailer 200.

Figure 4:
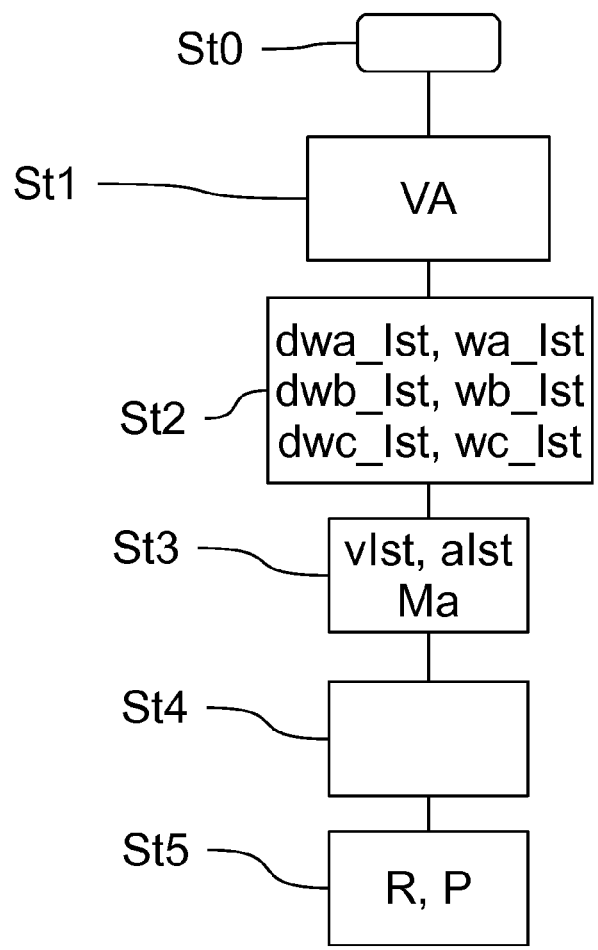
FIG. 4 shows a flow diagram of the method according to the invention.

According to FIG. 4, the method according to the invention can be carried out, for example, as follows:

In an initial step St0 the method is initialized, for example with the starting of the vehicle 100, and after it has been determined that there is no electrical defect in the brake system 1, i.e. the central module 9 can, in particular, perform a control operation of the ABS control valves 5a, 5b and of the switching valves 8a, 8b and/or of the pressure control valve 14.

In a first step St1 it is tested whether an assistance braking specification VA is present in the central module 9, i.e. a braking operation is requested in an automated fashion. In a second step St2, a corresponding actual dynamics variable, i.e. either the actual wheel acceleration dwa_Ist, dwb_Ist, dwc_Ist or the actual wheel speed wa_Ist, wb_Ist, wc_Ist of the respective wheels 2a, 2b, 2c which are to braked as a result of the assistance braking specification VA which is requested in an automated fashion is detected as described above and assigned to the respective wheel 2a, 2b, 2c.

In a third step St3, the reference dynamics variable, i.e. the vehicle actual speed vIst and/or the vehicle actual acceleration aIst or the mean value Ma is ascertained as described above. In a fourth step St4, the corresponding actual dynamics variable dwa_Ist, dwb_Ist, dwc_Ist, wa_Ist, wb_Ist, wc_Ist is subsequently compared with the reference dynamics variable vIst, aIst, Ma. If it is determined here that when an assistance braking specification VA is present, the corresponding actual dynamics variable dwa_Ist, dwb_Ist, dwc_Ist, wa_Ist, wb_Ist, wc_Ist deviates, while taking into account the noise deviation R, at least temporarily from the corresponding reference dynamics variable vIst, aIst, Ma by the pulse deviation P, in a fifth step St5 it is inferred that there is faultfree implementation of the assistance braking specification VA which is requested in an automated fashion. If this is not the case, faulty implementation is assumed, in particular owing to a mechanical defect in the respective switching valve 8a, 8b as described above, and this is correspondingly signaled.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS (PART OF THE DESCRIPTION)

1 Brake system
2a Front wheels

2b Rear wheels
2c Trailer wheels
3a Front axle
3b Rear axle
3c Trailer axle
4a Front-axle service brakes
4b Rear-axle service brakes
4c Trailer service brakes
5a Front-axle ABS control valves
5b Rear-axle ABS control valves
6a Front-axle relay valve
6b Rear-axle relay valve
7 Service brake valve
8a Front-axle switching valve
8b Rear-axle switching valve
9 Central module
10a Front-axle pressure medium reservoir
10b Rear-axle pressure medium reservoir
10c Multi-purpose pressure medium reservoir
11 Trailer pressure line
12 Trailer control valve
13 Driving assistance control module
14 Pressure control valve
20a Front-axle wheel speed sensors
20b Rear-axle wheel speed sensors
20c Trailer wheel-speed sensors
30 Multi-purpose pressure medium
100 Vehicle
200 Trailer
aIst Vehicle actual acceleration
dwa_Ist Front-axle actual wheel acceleration
dwb_Ist Rear-axle actual wheel acceleration
dwc_Ist Trailer actual wheel acceleration
Ma Mean value
P Pulse deviation
pBa Front-axle service-brake brake pressure
pBb Rear-axle service-brake brake pressure
pBc Trailer service-brake brake pressure
pSa Front-axle service-brake control pressure
pSb Rear-axle service-brake control pressure
pT Trailer control pressure
p10c Multi-purpose pressure medium pressure
R Noise deviation
S1, S2, S3, S4 Steps
SABS ABS control signal
Swa, Swb Wheel rotation speed signals
t1, t2, t3, t4 Times
VA Assistance braking specification
VB Service-brake braking specification
vIst Vehicle actual speed
wa, wb, wc Wheel speeds
wa_Ist Front-axle actual wheel speeds
wb_Ist Rear-axle actual wheel speeds
wc_Ist Trailer actual wheel speeds
X1 First switching-valve switched position
X2 Second switching-valve switched position
St1, St2, St3, St4, St5 Steps of the method

The invention claimed is:

1. A method for monitoring an implementation of an assistance braking specification, requested in an automated fashion, by a brake system comprising an ABS brake system, in a vehicle comprising a utility vehicle, having at least the following steps:
 detecting whether an assistance braking specification which is requested in an automated fashion is present;
 detecting an actual dynamics variable, the actual dynamics variable comprising wheel dynamics of at least one wheel of the vehicle and/or of a trailer, the actual dynamics variable being assigned to a wheel which is to be braked as a result of the assistance braking specification which is requested in an automated fashion;
 determining a reference dynamics variable, the reference dynamics variable comprising driving dynamics of the vehicle and/or of the trailer; and
 comparing the actual dynamics variable with the reference dynamics variable,
 wherein when an assistance braking specification is present:
  a faultfree implementation of the assistance braking specification which is requested in an automated fashion is detected if the actual dynamics variable deviates, taking into account a noise deviation, at least temporarily from the reference dynamics variable by a pulse deviation, and/or
  a faulty implementation of this assistance braking specification which is requested in an automated fashion is detected if the actual dynamics variable does not deviate, taking into account the noise deviation, from the reference dynamics variable by a pulse deviation.

2. The method as claimed in claim 1, wherein the actual dynamics variable is determined on an axle basis and/or on a wheel basis.

3. The method as claimed in claim 1, wherein the actual dynamics variable comprises an actual wheel acceleration or an actual wheel speed of a respective wheel of the vehicle or of the trailer,
 wherein the actual wheel acceleration is determined from actual wheel speeds of the respective wheel, and
 wherein the actual wheel speeds specify current wheel dynamics of the respective wheel.

4. The method as claimed in claim 3, wherein the actual wheel acceleration follows from the actual wheel speeds by a mathematical derivation.

5. The method as claimed claim 1, wherein the reference dynamics variable is specified by a current vehicle actual acceleration and/or a current vehicle actual speed and/or a mean value of the actual dynamics variable plotted against time.

6. The method as claimed claim 1, wherein the noise deviation specifies noise in the measurement variables which characterize the wheel dynamics.

7. The method as claimed claim 1, wherein the pulse deviation corresponds at least to the noise deviation.

8. The method as claimed claim 7, wherein the pulse deviation corresponds at least to twice the noise deviation.

9. The method as claimed claim 1, wherein, to implement the assistance braking specification which is requested in an automated fashion, a service-brake brake pressure at service brakes at the respective wheels of the vehicle and/or of the trailer is increased incrementally.

10. The method as claimed in claim 9, further comprising determining whether a pulse deviation occurs at the respective wheel owing to the incremental increasing of the service-brake brake pressure, the pulse deviation being dependent on a magnitude of the service-brake brake pressure.

11. The method as claimed in claim 10, wherein the pulse deviation becomes greater as the service-brake brake pressure rises.

12. The method as claimed in claim 10, wherein the incremental increasing of the service-brake brake pressure takes place:

at the service brakes of the vehicle by actuating ABS control valves, and/or at service brakes of the trailer by actuating the pressure control valve, and by switching a switching valve from a first switching-valve switched position into a second switching-valve switched position in which a multi-purpose pressure medium is released from a multi-purpose pressure medium reservoir.

13. The method as claimed in claim 12, further comprising, if no faultfree implementation of the assistance braking specification has been detected, inferring that there is a mechanical defect in the switching valve and/or in the pressure control valve and/or in the ABS control valves; and outputting a warning signal and/or an assistance braking specification which has been requested in an automated fashion is aborted.

14. The method as claimed claim 1, wherein when an assistance braking specification is present, a faultfree or faulty implementation of this assistance braking specification which is requested in an automated fashion is detected by comparing the actual dynamics variable with the reference dynamics variable, without having recourse to a pressure sensor.

15. A brake system comprising ABS brake system, for a vehicle, comprising a utility vehicle, the brake system comprising:

a service brake valve configured to receive a service-brake braking specification;

at least one relay valve which is assigned to a vehicle axis of the vehicle and is configured to output a service-brake brake pressure to service brakes of the vehicle;

a switching valve which is connected upstream of the at least one relay valve, in a first switching-valve switched position the switching valve being configured to pass on a service-brake control pressure, which is output by the service brake valve as a function of the service-brake braking specification to the at least one relay valve in order to output the service-brake brake pressure by the at least one relay valve as a function of the service-brake control pressure, and in a second switching-valve switched position the switching valve being configured to connect a pressure medium reservoir to the relay valve in order to output a service-brake brake pressure by the at least one relay valve as a function of a multi-purpose pressure medium pressure in the multi-purpose pressure medium reservoir;

ABS control valves which are connected upstream of the service brakes and are configured to adapt the service-brake brake pressure, which is output by the at least relay valve; and a central module configured to control the ABS control valves and the switching valve and to carry out a method for adapting the service-brake brake pressure, which is output by the at least one relay valve, as a function of the current assistance braking specification, the method for adapting the service-brake pressure comprising:

detecting whether an assistance braking specification which is requested in an automated fashion is present;

detecting an actual dynamics variable, the actual dynamics variable comprising wheel dynamics of at least one wheel of the vehicle and/or of a trailer, the actual dynamics variable being assigned to a wheel which is to be braked as a result of the assistance braking specification which is requested in an automated fashion;

determining a reference dynamics variable, the reference dynamics variable comprising driving dynamics of the vehicle and/or of the trailer; and comparing the actual dynamics variable with the reference dynamics variable, wherein when an assistance braking specification is present:

a faultfree implementation of the assistance braking specification which is requested in an automated fashion is detected if the actual dynamics variable deviates, taking into account a noise deviation, at least temporarily from the reference dynamics variable by a pulse deviation, and/or a faulty implementation of this assistance braking specification which is requested in an automated fashion is detected if the actual dynamics variable does not deviate, taking into account the noise deviation, from the reference dynamics variable by a pulse deviation.

16. The brake system as claimed in claim 15, further comprising a pressure control valve in a trailer pressure line, the trailer pressure line connecting the switching valve on a pressure output side to a trailer control valve, the pressure control valve being configured to be actuated by the central module as a function of the assistance braking specification such that a trailer control pressure is applyable to trailer service brakes via the trailer control valve, which trailer control pressure permits implementation of the assistance braking specification via the trailer.

17. The brake system of claim 15, wherein the brake system is arranged in a utility vehicle.

* * * * *